United States Patent
Kotachi et al.

(10) Patent No.: US 7,235,275 B2
(45) Date of Patent: Jun. 26, 2007

(54) PROCESS FOR PREPARING ORANGE OIL

(75) Inventors: Shinji Kotachi, Wakayama (JP); Junko Ueda, Wakayama (JP); Shigeyoshi Tanaka, Wakayama (JP)

(73) Assignee: Kao Corporation, Tokyo (JP)

( * ) Notice: Subject to any disclaimer, the term of this patent is extended or adjusted under 35 U.S.C. 154(b) by 680 days.

(21) Appl. No.: 10/421,787

(22) Filed: Apr. 24, 2003

(65) Prior Publication Data

US 2003/0203090 A1  Oct. 30, 2003

(30) Foreign Application Priority Data

Apr. 26, 2002 (JP) .............................. 2002-125080
Apr. 26, 2002 (JP) .............................. 2002-125081

(51) Int. Cl.
  *A23L 1/22* (2006.01)
(52) U.S. Cl. ..................... 426/534; 426/425; 426/429; 426/616; 426/650
(58) Field of Classification Search ............... 426/386, 426/387, 425, 429, 534, 536, 538, 615, 616, 426/650
See application file for complete search history.

(56) References Cited

U.S. PATENT DOCUMENTS 4,693,905 A * 9/1987 Japikse et al. .............. 426/599
4,973,485 A * 11/1990 Rich ........................... 426/534
5,173,479 A   12/1992 Tajima et al.

FOREIGN PATENT DOCUMENTS

| EP | 0 481 521 | 4/1992 |
|---|---|---|
| EP | 0 618 285 | 10/1994 |
| JP | 4-154898 | 5/1992 |
| JP | 5-003506 | 1/1993 |
| JP | 6-287592 | 10/1994 |

OTHER PUBLICATIONS

English Abstract of JP 58-164699, 1983.
H. Bovill, et al., Perfumer and Flavorist, vol. 21, pp. 9-11, "Natural Aroma Chemicals From Oranges and Other Botanical Sources", May/Jun. 1996.
J. H. Flores, et al., Perfumer and Flavorist, vol. 21, pp. 13-15 "Citrus Oil Recovery During Juice Extraction", May/Jun. 1996.

\* cited by examiner

*Primary Examiner*—Leslie Wong
(74) *Attorney, Agent, or Firm*—Oblon, Spivak, McClelland, Maier & Neustadt, P.C.

(57) ABSTRACT

A process for preparing an orange oil comprising the steps of mixing a raw material oil containing valencene with a high-boiling solvent having a boiling point exceeding 240° C. under normal pressure, to give a mixture, and fractionally distilling the mixture obtained, optionally comprising the step of subjecting to an alkali treatment the raw material oil before fractional distillation or a distillate fraction obtained after fractional distillation; and an orange oil obtained by the process as defined above.

14 Claims, No Drawings

PROCESS FOR PREPARING ORANGE OIL

BACKGROUND OF THE INVENTION

1. Field of the Invention

The present invention relates to a process for preparing an orange oil, and an orange oil.

2. Discussion of the Related Art

Valencene is contained at 0.2 to 0.6% by weight in an orange essence oil, which is obtained by squeezing fruit of oranges, a group of plants belonging to the genus Citrus in the family Rutaceae. Ninety percent by weight or more of the orange essence oil is accounted for by terpenes having low boiling points (200° C. or lower), mainly composed of limonene, which have only a low contribution to the aroma of the oil. Therefore, it is not so difficult to concentrate valencene up to about 100-folds by distilling off these terpenes. Generally, commercial products having valencene concentrations of 70 to 90% by weight, obtained by concentrating an orange essence oil by distillation, are available in the market (Perfumer & Flavorist, Vol. 21, May/June, p. 9, 1996). Additionally, valencene is also contained in the essential oil of a fruit peel, known as an orange cold press peel oil, or in an oil obtained by distilling pulp or the like after squeezing the fruit. Since the major components of these oils are likewise terpenes, mainly composed of limonene, valencene in the oil can be easily concentrated up to about 100-folds. However, since the valencene content in the oil is very low (0.02% by weight) as compared to that in the essence oil, the valencene concentration increases only up to 2 to 3% by weight even when the oil is concentrated 100-folds. In addition, since the oil concentrated so as to have a valencene concentration of 2 to 3% by weight contains a large amount of components having boiling points slightly lower than that of valencene, it will not be easy to further concentrate the oil. There have not yet been known to date any processes for preparing an oil containing valencene at a high concentration from these oils.

Moreover, the currently marketed orange oils containing valencene in an amount of 70 to 90% by weight are prepared by concentrating an orange essence oil obtained by squeezing fruit. Therefore, the orange oils have limitations in the amount of production and are expensive, thereby giving rise to causations for the limitations in the amount of use and applicability. Hence, there is an earnest desire for an orange oil that is inexpensive and high in valencene concentration.

In addition, since the currently marketed orange oils containing valencene in an amount of 70 to 90% by weight have an off-flavor like those of higher fatty acids and an undesirable taste, use of the orange oils has been also limited by this off-flavor or the like. Furthermore, an essential oil prepared by concentrating an orange essence oil has limitation in the amount of production and is expensive, thereby giving rise to causations for the limitations in the amount used and applicability. Therefore, there is an earnest desire for an inexpensive orange oil containing valencene free from an off-flavor.

SUMMARY OF THE INVENTION

An object of the present invention is to provide a process capable of inexpensively and efficiently preparing an orange oil containing valencene at a high concentration, and a process capable of inexpensively and efficiently preparing an orange oil containing valencene at a high concentration and being free from the off-flavor.

These and other objects of the present invention will be apparent from the following description.

The present invention relates to a process for preparing an orange oil comprising the steps of mixing a raw material oil containing valencene with a high-boiling solvent having a boiling point exceeding 240° C. under normal pressure, to give a mixture, and fractionally distilling the mixture obtained, optionally comprising the step of subjecting to an alkali treatment the raw material oil before fractional distillation or a distillate fraction obtained after fractional distillation.

The present invention also relates to an orange oil obtained by the process as defined above.

DETAILED DESCRIPTION OF THE INVENTION

In view of the above, the present inventors have intensively investigated to concentrate valencene from the oil obtained from fruit peel and/or pulp, which has not been conventionally used as a raw material for an orange oil containing valencene. As a result, it has been found that the temperature inside the chamber or tower must be increased to as high as 220° C. or higher in order to completely recover valencene by distillation from fruit peel and/or pulp, because the fruit peel and/or pulp has a low valencene content, valencene has a high boiling point (about 240° C. under normal pressure), and also components having boiling points slightly higher than that of valencene are present only in small amounts. Moreover, it has been found that low-boiling components such as water are produced by side reactions such as thermal decomposition of high-boiling components under the high-temperature conditions as mentioned above, so that reduced pressure cannot be maintained, thereby making it difficult to completely recover valencene. Furthermore, it has been found that the orange oil obtained by distillation at a high temperature cannot be directly used as a fragrance material or a flavor material due to its strong malodor caused by over-heating and existence of volatile components produced by thermal decomposition.

As a result, the present inventors have found for the first time that when valencene in a raw material oil is concentrated by fractional distillation, valencene can be concentrated by mixing the raw material oil with a high-boiling solvent having a boiling point exceeding that of valencene, and fractionally distilling the mixture obtained at temperatures around 200° C., thereby preventing side reactions such as thermal decomposition, and dramatically reducing residual valencene in the distillation residue. In addition, the present inventors have found for the first time that the off-flavor can be efficiently removed by, for instance, subjecting a raw material oil to an alkali treatment, and that the orange oil thus obtained has a clean orange-like aroma. Based on these findings, a high-quality orange oil free from the malodor caused by over-heating and the off-flavor of the volatile components and fatty acids is obtained.

Accordingly, an advantage of the present invention is to provide a process capable of inexpensively and efficiently preparing an orange oil containing valencene at a high concentration, and a process capable of inexpensively and efficiently preparing an orange oil containing valencene at a high concentration and being free from the off-flavor.

The term "orange oil" as used herein refers to a concentrate of valencene. The term "normal pressure" refers to a standard atmospheric pressure (101.3 kPa). The term "fractional distillation" refers to an embodiment of distillation in which a multi-component liquid mixture is distilled to be separated into individual components, whereas the term simply referred to as "distillation" refers to a procedure of heating a solution to a boiling point thereof, cooling the resulting vapor, and collecting the vapor in the form of liquid in a receiver.

The raw material oil used in the present invention may be any oil that serves as a raw material for an orange oil, as long as the oil contains valencene. In particular, the raw material oil is preferably an oil obtained from the fruit of a plant belonging to the genus Citrus in the family Rutaceae because of its high valencene content. The fruit of a plant belonging to the genus Citrus in the family Rutaceae includes oranges, sweet oranges, mandarins, sour oranges and the like.

The raw material oil includes an essence oil obtained by squeezing the above-mentioned fruits, a cold press peel oil from the peel of the above-mentioned fruits, an oil obtained from pulp after squeezing the fruit, and an oil obtained by subjecting these oils to a distillation or rectification procedure. These raw material oils may be used alone or in mixture of two or more kinds.

The high-boiling solvent used in the present invention, having a boiling point exceeding 240° C. under normal pressure (hereinafter also referred to as "high-boiling solvent") is preferably a high-boiling solvent having a boiling point exceeding 240° C. and 300° C. or less, more preferably a high-boiling solvent having a boiling point of 245° to 300° C. Among them, a saturated or unsaturated alcohol having 11 to 20 carbon atoms, especially 12 to 15 carbon atoms, a hydrocarbon having 14 to 20 carbon atoms, especially 15 to 17 carbon atoms, or a mixture thereof is preferred as the high-boiling solvent. The carbon chain constituting a principal chain or side chain of each of these alcohols or hydrocarbons may be linear or branched. Examples of the above-mentioned saturated or unsaturated alcohol include n-dodecanol, n-tetradecanol, n-tridecanol and the like. The above-mentioned hydrocarbon includes tetradecane, pentadecane, hexadecane and the like. These high-boiling solvents can be used alone or in mixture of two or more kinds. These high-boiling solvents may be also used in mixture with an ether, an ester, liquid paraffin, or the like.

In the process of the present invention, first, the above-mentioned raw material oil and the above-mentioned high-boiling solvent are mixed. The amount of the high-boiling solvent used is preferably from 1 to 200 parts by weight, more preferably from 10 to 100 parts by weight, based on 100 parts by weight of the raw material oil.

Next, the mixture of the raw material oil and the high-boiling solvent is subjected to fractional distillation. From the viewpoint of efficiently concentrating valencene, it is preferable that this fractional distillation is carried out by rectification, more preferably rectification under reduced pressure. For example, the number of stages of the rectification tower used for rectification is preferably from about 5 to about 80. The pressure at the tower top is preferably from 0.1 to 2.7 kPa, more preferably from 0.5 to 0.7 kPa. The temperature inside the tower is preferably from 40° to 150° C., more preferably from 60° to 120° C. During this step, the temperatures inside the distillation vessel and the tower are preferably adjusted to 220° C. or less in order to suppress thermal decomposition. Other conditions are not particularly limited.

The orange oil thus obtained has a valencene concentration of 20 to 60% by weight, a sufficient level to be utilized as a fragrance material or a flavor material, or a raw material for fragrance or flavor such as nootkatone. Also, it is preferable that the orange oil has an acid value of usually from 3 to 30 mg KOH/g. As described above, according to the process for preparing an orange oil of the present invention, there is obtained an excellent orange oil containing valencene at a higher concentration and having reduced off-flavor, as compared to those of conventional orange oils. However, in the above-mentioned process for preparing an orange oil, a very excellent orange oil containing valencene at a still higher concentration and having further reduced off-flavor is obtained by, for instance, further subjecting the raw material oil to an alkali treatment as described below.

The term "acid value" as used herein can be determined by the method described in the Examples set forth below.

Accordingly, a more preferred embodiment of the process for preparing an orange oil of the present invention further comprises the step of subjecting to an alkali treatment a raw material oil before fractional distillation or a distillate fraction obtained after fractional distillation.

The raw material oil before fractional distillation (hereinafter simply referred to as raw material oil) may be a raw material oil before mixing with a high-boiling solvent or a mixture obtained by mixing a raw material oil with a high-boiling solvent, preferably a raw material oil before mixing with a high-boiling solvent. In addition, the distillate fraction obtained after fractional distillation (hereinafter simply referred to as distillate fraction) refers to, for instance, the above-mentioned orange oil before alkali treatment, obtained in the above-mentioned step.

The alkali treatment comprises contacting the raw material oil or distillate fraction with an alkali substance, and distilling or filtering the mixture obtained. The raw material oil or distillate fraction is contacted with the alkali substance usually by mixing the raw material oil or distillate fraction with the alkali substance, and stirring the resulting mixture.

In the present invention, a preferred embodiment of the alkali treatment step includes an embodiment comprising the steps of mixing a raw material oil or a distillate fraction with an alkali substance, and distilling or filtering the mixture obtained. There are some advantages in the present invention such that an orange oil can be prepared, with suppressing the distillation of alcohols having boiling points closer to that of valencene, and the distillation of acidic substances such as higher fatty acids, which can cause the off-flavor, by mixing the raw material oil or distillate fraction with the alkali substance, and then distilling or filtering the mixture obtained, preferably without removing the alkali substance, as described above.

When the alkali substance is in the form of an aqueous solution as described below, a preferred embodiment of the alkali treatment step comprises the steps of mixing a raw material oil or distillate fraction with an aqueous solution of the alkali substance, removing an aqueous layer from the mixture obtained, and distilling the mixture after the removal of the aqueous layer.

The alkali substance used in the present invention includes, for instance, alkali metal hydroxides such as sodium hydroxide and potassium hydroxide, alkali metal carbonates such as sodium carbonate and potassium carbonate, alkaline earth metal hydroxides such as calcium hydroxide, alkaline earth metal oxides such as magnesium oxide, and alkali metal or alkaline earth metal alcoholates such as sodium methylate, or solid bases such as basic aluminum oxide. Regarding the form of use of the alkali substance, the alkali substance may be used directly or in the form of a solution containing the alkali substance. The solution containing the alkali substance includes aqueous solutions and solutions in alcoholic solvents. The alcoholic solvent includes methanol, ethanol, glycerol and the like.

From the viewpoint of sufficient removal of acidic substances, it is preferable that the amount of these alkali substances used is from 1 to 10 times by mol, more preferably from 2 to 6 times by mol, relative to the acid value of the raw material oil or distillate fraction.

The conditions for mixing and stirring the raw material oil or distillate fraction with the alkali substance are not particularly limited. It is preferable that the mixing and stirring are carried out at 0° to 200° C. (especially at 50° to 150° C.) for 0.1 to 10 hours (especially for 0.5 to 3 hours). The above-mentioned mixing and stirring may be carried out using a commonly known reactor equipped with a reaction vessel.

When the alkali substance is used in the form of an aqueous solution or an alcoholic solution containing the alkali substance, water or the alcoholic solvent used may be removed after the above-mentioned solution is mixed with the raw material oil or distillate fraction, or may be removed at the same time while the solution is mixed with the raw material oil or distillate fraction. In particular, from the viewpoint of shortening the solvent removal step, a preferred embodiment for the alkali treatment step comprises the step of adding dropwise an aqueous solution of an alkali substance or an alcoholic solution of an alkali substance to the raw material oil before fractional distillation or the distillate fraction obtained after fractional distillation, and at the same time removing water or an alcoholic solvent from the mixture obtained. The method for removing water or the alcoholic solvent includes removal by distillation. The phrase "at the same time" is not intended to be taken literally, but simply referring to within a short time period after or a very short time period after mixing the aqueous solution or alcoholic solution of the alkali substance with the raw material oil or the distillate fraction.

The mixing and stirring of the above-mentioned raw material oil or the distillate fraction with the alkali substance may be carried out in the presence of an organic solvent other than the above-mentioned alcoholic solvent. This embodiment offers advantages such that the viscosity of the above-mentioned raw material oil or the distillate fraction during distillation can be reduced, and that the viscosity of the residue can be reduced depending upon some kinds of solvents. The organic solvent is not particularly limited, as long as the organic solvent is stable under alkaline conditions, including aromatic hydrocarbons such as toluene and xylene; hydrocarbons such as hexane, methylcyclohexane and liquid paraffin; ethers such as diethyl ether and dibutyl ether; alcohols other than those mentioned above, such as butanol; and glycols other than those mentioned above, such as ethylene glycol. The amount of the organic solvent used is preferably from 1 to 200 parts by weight, more preferably from 10 to 100 parts by weight, based on 100 parts by weight of the raw material oil. When an organic solvent is used, there is no particular limitation on the order, the method, or the like for mixing the organic solvent with the raw material oil or the distillate fraction and the alkali substance.

When the aqueous solution of the alkali substance is used, as mentioned above, the method for removing the aqueous layer from the mixture of the raw material oil or the distillate fraction and the aqueous solution includes, for instance, a method comprising separating the mixture into an aqueous layer and an oily layer after mixing, stirring and allowing the mixture to stand or the like, and thereafter removing the aqueous layer located in a lower layer. It is preferable that the oily layer obtained is subjected to washing with water and/or distillation and the like by ordinary methods as desired, thereby separating the alkali substance from the orange oil.

The distillation in the alkali treatment may be usually carried out using a commonly known distillator, or may be subsequently carried out in the above-mentioned reactor. The distillation can preferably be carried out at temperatures of from 50° to 250° C., more preferably from 100° to 220° C., and under pressures of from 0.01 to 2.6 kPa, more preferably from 0.13 to 1.3 kPa.

The orange oil thus obtained has a dramatically reduced acid value as compared to that of the above-mentioned orange oil without being subjected to an alkali treatment, thereby removing causation of the off-flavor and giving a clean orange-like aroma. From the viewpoint of aroma improvement, it is preferable that the above-mentioned acid value is 3 mg KOH/g or less, more preferably 1 mg KOH/g or less.

Also, the orange oil obtained by subjecting to the alkali treatment has an improved valencene content as compared to that of the above-mentioned orange oil without subjecting to the alkali treatment. The valencene concentration of the orange oil is preferably from 20 to 80% by weight, more preferably from 30 to 80% by weight. Accordingly, it is especially preferable that the orange oil of the present invention obtained through the steps of the fractional distillation and the alkali treatment has a valencene content of from 20 to 80% by weight and an acid value of 1 mg KOH/g or less.

According to the present invention, there can be prepared conveniently and inexpensively an orange oil having an improved valencene content with components giving rise to causation for the off-flavor (acidic substances such as carboxylic acid and phenol) or the like being removed. Also, according to the present invention, there can be efficiently prepared an orange oil containing valencene at a high concentration, having a low acid value, and having a significantly reduced off-flavor even from the raw material oil obtained from fruit peel and/or pulp, which has not been so far used as a raw material. The orange oil of the present invention may have properties sufficient to use it as a fragrance material or a flavor material, or a raw material for fragrance or flavor such as nootkatone.

Hence, according to the process of the present invention, there can be inexpensively and efficiently prepared an orange oil containing valencene at a high concentration. Furthermore, in the process of the present invention, valencene can be more efficiently concentrated using orange essence oil, which has been conventionally used as a source of valencene, as a raw material oil.

EXAMPLES

The present invention will be explained concretely by illustrating with the following Examples, without intending to limit the scope or spirit of the present invention thereto.

[Method for Determination of Acid Value]

A 300-ml Erlenmeyer flask was charged with 20 g of a sample and 30 mL of a mixed solvent (prepared by mixing a phenolphthalein indicator solution with a toluene-ethyl alcohol mixed solution (volume ratio: 2/1) so as to have a concentration of 1% by weight, and neutralizing the mixture immediately before use to give a pale crimson color), and the sample was dissolved.

Next, when the acid value was low, titration was carried out against a 0.1 mol/L alcoholic potassium hydroxide standard solution, and when the acid value was high, titration was carried out against a 0.5 mol/L alcoholic potassium hydroxide standard solution. Here, the end point was determined as a point where the pale crimson color continued for 30 seconds, or by potentiometric titration.

[Evaluation of Aroma]

The oil or the formulated perfume was applied to a piece of a paper blotter (small piece of a rectangular strip), and the sensory evaluation on aroma was carried out.

Example 1

Seven-hundred and seventy grams of n-tetradecanol (boiling point: 287° C.) was mixed with 3900 g of a raw material oil (concentrate obtained by distillation of an oil obtained from fruit peel and pulp of sweet oranges, valencene concentration: 3% by weight), and the mixture was subjected to rectification with a packing 50-stage rectification tower at a pressure at the tower top of 0.8 kPa and a temperature at the tower top of from 96° to 120° C. (final chamber temperature: 200° C.). As a result, 220 g of a distillate fraction having a valencene concentration of 43% by weight was obtained. The resulting distillate fraction had excellent quality, free from distillation odor generated when distilled at a high temperature and from off-flavor ascribed to the low-boiling volatile components. Also, valencene was not contained in the distillation residue at all.

Example 2

Two-hundred and eighty grams of n-dodecanol (boiling point: 260° C.) was mixed with 1350 g of the raw material oil described in Example 1, and the mixture was subjected to rectification with a packing 50-stage rectification tower at a pressure at the tower top of 0.7 kPa and a temperature at the tower top of from 97° to 117° C. (final chamber temperature: 200° C.). As a result, 86 g of a distillate fraction having a valencene concentration of 43% by weight was obtained. The resulting distillate fraction had excellent quality, free from distillation odor generated when distilled at a high temperature and from off-flavor ascribed to the low-boiling volatile components. Also, valencene was not contained in the distillation residue at all.

Comparative Example 1

The raw material oil described in Example 1 was subjected to distillation with a packing 50-stage rectification tower at a pressure at the tower top of 0.7 kPa and an elevated temperature inside the chamber up to 200° C. However, valencene was not distilled at all. Therefore, the temperature was further raised and attempted to be distilled. As a result, white fume came out at a temperature near 215° C. so that reduced pressure could not be maintained, but valencene could be distilled by heating to a temperature of 250° C. However, valencene still remained in a large amount in the distillation residue. Also, the resulting valencene had a strong distillation odor, and contained a large amount of the low-boiling point distillation fraction, so that the resulting product did not have quality which can be used as a fragrance material or a flavor material. Also, even at 215° C., there was no distillation, and white fume came out from the tower, so that reduced pressure could not be maintained.

It can be seen from the above results that both the orange oils obtained in Examples 1 and 2 are ones in which valencene contained in the raw material oil is efficiently collected as compared to that of Comparative Example 1.

Example 3

One-hundred and twenty kilograms of n-tetradecanol (boiling point: 287° C.) was added to 300 kg of a high-boiling distillate fraction derived from orange fruit peel and pulp after squeezing fruit (valencene concentration: about 2.5% by weight, acid value: 9.9 mg KOH/g), and the mixture was subjected to rectification with a 50-stage rectification tower at a pressure at the tower top of from 0.1 to 0.7 kPa and a temperature at the tower top of from 93° to 100° C. As a result, a valencene concentrate distillate fraction (orange oil: valencene concentration: 44% by weight, acid value: 22.7 mg KOH/g) was obtained. The resulting orange oil was free from distillation odor and from off-flavor ascribed to the low-boiling volatile components. However, the resulting orange oil had an orange-like aroma which was heavy and non-refreshing with a strong carboxylic acid odor and undesirable taste.

Example 4

A 100 mL four-neck flask equipped with a stirrer and a thermometer was charged with 50 g of the valencene concentrate distillate fraction obtained in Example 3 (valencene concentration: 44% by weight, acid value: 22.7 mg KOH/g) and 23 g of a 28 (w/w) % methanol solution of sodium methylate (prepared by adding sodium methylate in an amount of 6 times by mol relative to the acid value of the valencene concentrate distillate fraction), and the mixture was stirred at 60° C. for 1 hour. Thereafter, methanol was distilled off, and the concentrate was further subjected to distillation under reduced pressure (200° C., under pressure of 0.26 kPa), to give 29 g of a distillate fraction. The resulting distillate fraction (orange oil) was one in which the valencene concentration was improved up to 67% by weight, and had a clean orange-like aroma (acid value: 0.03 mg KOH/g) as compared to the orange oil before alkali treatment.

Example 5

A 200 mL four-neck flask equipped with a stirrer and a thermometer was charged with 50 g of the valencene concentrate distillate fraction obtained in Example 3 (valencene concentration: 44% by weight, acid value: 22.7 mg KOH/g). After heating the content to 80° C., 23 g of a 28 (w/w) % methanol solution of sodium methylate (prepared by adding sodium methylate in an amount of 6 times by mol relative to the acid value of the valencene concentrate distillate fraction) was added dropwise thereto over 1 hour with gradually raising the chamber temperature and distilling off methanol. The mixture was stirred at 130° C. for 1 hour to distill off residual methanol. After the distillation, 50 g of liquid paraffin was added to the concentrate, and the resulting mixture was subjected to distillation under reduced pressure (200° C., under pressure of 0.26 kPa), to give 29 g of a distillate fraction. The resulting distillate fraction (orange oil) was one in which the valencene concentration was improved up to 65% by weight, and had a clean orange-like aroma (acid value: 0.01 mg KOH/g) as compared to the orange oil before alkali treatment.

Example 6

A 200 mL four-neck flask equipped with a stirrer and a thermometer was charged with 50 g of the valencene concentrate distillate fraction obtained in Example 3 (valencene concentration: 44% by weight, acid value: 22.7 mg KOH/g), 6.8 g of KOH (being in an amount 6 times by mol relative to the acid value of the valencene concentrate distillate fraction) and 50 g of glycerol. The mixture was stirred at 60° C. for 1 hour, and thereafter the mixture was subjected to distillation under reduced pressure (200° C., under pressure of 0.26 kPa), to give 43 g of a distillate fraction. The resulting distillate fraction (orange oil) was one in which the valencene concentration was improved up to 50% by weight, and had a clean orange-like aroma (acid value: 0.05 mg KOH/g) as compared to the orange oil before alkali treatment.

Example 7

A 200 mL four-neck flask equipped with a stirrer and a thermometer was charged with 50 g of the valencene concentrate distillate fraction obtained in Example 3 (valencene concentration: 44% by weight, acid value: 22.7 mg KOH/g), and 48.6 g of a 10% NaOH (NaOH being in an amount 6 times by mol relative to the acid value of the valencene concentrate distillate fraction). The mixture was stirred at 60° C. for 1 hour, an aqueous layer was then removed, and an organic layer was subjected to distillation under reduced pressure (200° C., under pressure of 0.26 kPa), to give 43 g of a distillate fraction. The resulting distillate fraction (orange oil) was one in which the valencene concentration was improved up to 49% by weight, and had a clean orange-like aroma (acid value: 0.47 mg KOH/g) as compared to the orange oil before alkali treatment.

Example 8

A 100 mL four-neck flask equipped with a stirrer and a thermometer was charged with 50 g of the valencene concentrate distillate fraction obtained in Example 3 (valencene concentration: 44% by weight, acid value: 22.7 mg KOH/g) and 16 g of a 28 (w/w) % methanol solution of sodium methylate (prepared by adding sodium methylate in an amount of 3.8 times by mol relative to the acid value of the valencene concentrate distillate fraction). The mixture was stirred at 60° C. for 1 hour, and thereafter methanol was distilled off. Further, the remaining product (mixture after methanol was distilled off) was filtered with a filter paper [5C, commercially available from Toyo Roshi Kabushiki Kaisha]. The filtrate (orange oil) was one in which the valencene concentration was improved up to 59% by weight, and had a clean orange-like aroma (acid value: 0 mg KOH/g) as compared to the orange oil before alkali treatment.

Test Example

Each of perfumes 1 and 2 for use in indoor aromatic having grapefruit-like aroma was formulated using the orange oils obtained in Examples 3 and 4. The evaluation on aroma was made by five specialized panelists. The perfume 2 had a refreshing grapefruit aroma with excellent diffusability, whereas the perfume 1 had no malodor caused by over-heating and no off-flavor ascribed to the low-boiling volatile components, but had a grapefruit-like aroma which was heavy and non-refreshing with a strong carboxylic acid odor and undesirable taste.

TABLE 1

| Composition of Perfume for Indoor Aromatic (Parts by Weight) | Perfume 1 | Perfume 2 |
|---|---|---|
| Limonene | 860 | 860 |
| Octyl Acetate | 5 | 5 |
| Ethyl Octanoate | 2 | 2 |
| POIRENATE (trade name, commercially available from Kao Corporation) | 10 | 10 |
| FRUTATE (trade name, commercially available from Kao Corporation) | 20 | 20 |
| Octanal | 1 | 1 |
| Decanal | 1 | 1 |
| Nootkatone | 1 | 1 |
| Orange Oil Obtained in Example 3 | 100 | — |
| Orange Oil Obtained in Example 4 | — | 100 |
| Total | 1000 | 1000 |

According to the present invention, there can be efficiently concentrated valencene from not only fruits such as oranges but also fruit peel or pulp of the fruits which have not been presently utilized, so that there can be inexpensively and effectively prepared an orange oil containing valencene at a high concentration and further being free from malodor caused by over-heating, off-flavor ascribed to a low-boiling point distillate fraction, and off-flavor such as an acidic odor. The orange oil can be preferably utilized not only as perfume intermediates but also as perfume materials.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing an orange oil comprising:
    mixing a raw material oil containing valencene with a high-boiling solvent having a boiling point exceeding 240° C. under normal pressure to produce a mixture, and
    fractionally distilling said mixture to obtain a distillate fraction containing an orange oil,
    wherein the high-boiling solvent is a saturated or unsaturated alcohol having 11 to 20 carbon atoms, a hydrocarbon having 14 to 20 carbon atoms, or a mixture thereof.

2. The process according to claim 1, wherein the raw material oil is obtained from a fruit of a plant belonging to the genus *Citrus* in the family Rutaceae.

3. The process according to claim 1, wherein the raw material oil is obtained from fruit peel and/or pulp after squeezing the fruit.

4. The process according to claim 1, wherein the high-boiling solvent is used in an amount of from 1 to 200 parts by weight, based on 100 parts by weight of the raw material oil.

5. The process according to claim 1, wherein fractional distilling is carried out by rectification under reduced pressure.

6. The process according to claim 1, further comprising subjecting the raw material oil to an alkali treatment before fractional distillation or subjecting a distillate fraction obtained after fractional distillation to an alkali treatment.

7. The process according to claim 6, wherein the alkali treatment comprises:
mixing the raw material oil before fractional distillation or the distillate fraction obtained after fractional distillation with an alkali substance, and
distilling or filtering the mixture obtained.

8. The process according to claim 6, wherein the alkali treatment comprises:
mixing the raw material oil before fractional distillation or the distillate fraction obtained after fractional distillation with an aqueous solution of an alkali substance,
removing an aqueous layer from the mixture obtained, and
distilling a mixture after removal of the aqueous layer.

9. The process according to claim 6, wherein the alkali treatment comprises:
adding dropwise an aqueous solution of an alkali substance or an alcoholic solution of an alkali substance to the raw material oil before fractional distillation or the distillate fraction obtained after fractional distillation, and
at the same time removing water or an alcoholic solvent from the mixture obtained.

10. The process according to claim 6, wherein the resulting orange oil has an acid value of 1 mg KOH/g or less.

11. The method of claim 1, wherein said raw material oil is an orange essence oil.

12. The method of claim 1, wherein said raw material oil is orange cold press peel oil.

13. The method of claim 1, wherein said raw material oil is obtained by distilling pulp after squeezing fruit.

14. The method of claim 1, wherein the fractional distillation is preformed at about 200° C.

* * * * *